United States Patent Office 3,849,359
Patented Nov. 19, 1974

3,849,359
AGENTS FOR THE MANUFACTURE OF ORGANO-POLYSILOXANE COATINGS WHICH REPEL ADHESIVE SUBSTANCES
Siegfried Nitzsche, Heinrich Marwitz, and Friedrich Hockemeyer, Burghausen, Germany, assignors to Wacker-Chemie GmbH, Munich, Germany
No Drawing. Filed Apr. 17, 1972, Ser. No. 244,945
Claims priority, application Germany, Apr. 20, 1971, P 21 19 120.8
Int. Cl. C08g 47/10, 51/28, 51/32
U.S. Cl. 260—32.6 R         24 Claims

ABSTRACT OF THE DISCLOSURE

A coating composition which imparts non-adherent properties to a substrate coated therewith comprising a solution of (1) a diorganopolysiloxane having silicon-bonded hydroxyl groups in the terminal units, (2) an organopolysiloxane free of amino groups and having silicon bonded hydrogen, (3) a tin compound and (4) an amino-substituted silicon compound comprising a copolymer of units of the formula

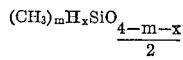

and an aminoorganosiloxane having units of the formula

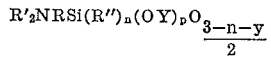

wherein R is a divalent hydrocarbon radical, R' is hydrogen or an alkyl or aminoalkyl radical, R'' is a monovalent hydrocarbon radical, Y is an alkyl radical having from 1 to 5 carbon atoms, $m$ and $x$ each have a value of from 0 to 3 with the average value of $m$ being from 0.9 to 2.5, $n$ and $p$ each have a value of from 0 to 2, with the sum of $n+p$ being less than 3.

---

This invention relates to a coating composition which will impart to cellulosic materials and other substrates varying degrees of repellency to various organic materials. More particularly, the invention is concerned with a process for rendering cellulosic or other substrates substantially non-adherent to normally adherent materials such as, for instance, asphalts, bitumen, tars, waxes, paraffin solids, foodstuffs, pastes and other high molecular weight polymers and adhesives which may come in contact with the cellulosic materials or other solid substrates.

It is well known that cellulosic materials and other substrates may be treated with silicones and a host of other materials containing a variety of siloxane polymers, particularly siloxane fluids and resins to render these substrates water repellent and abhesive (i.e. non adhesive or easily released from adhesive or sticky materials) [see, for example, W. Noll, "Chemie und Technologie der Silicone" ("Chemistry and Technology of Silicones"), Weinheim, 1968, pp. 520–521 and British Patent Specification 1,111,156].

Cellulosic materials, particularly paper treated with silicones can be used as intermediate layers, i.e. as easily removable separating layers, between sticky or auto-adhesive sheets or tapes. Also such papers may be used as separating layers for wrapping and storing adhesive substances such as asphalt, rubber stocks, and polymerizates, in order to prevent their sticking to each other or to other materials such as the walls of containers.

Several of the compositions used heretofore in the treatment of cellulosic materials to render them non-adherent to adhesive materials had a rapid cure rate and a short pot life. In order to extend the pot life, a long curing time had to be tolerated.

It is therefore an object of this invention to provide a coating composition which will impart release properties to a substrate coated therewith. Another object of this invention is to provide a coating composition which will impart non-adherent properties to a substrate coated therewith when contacted with adhesive materials. Another object of this invention is to provide a composition having a longer pot life. Still another object of this invention is to provide a composition which has a rapid cure rate when applied to a substrate. A further object of this invention is to provide coatings which adhere to the substrates and are more resistant to abrasion. Still another object of this invention is to provide coatings which have varying degrees of repellency when contacted with adhesive materials.

The foregoing objects and others which will become apparent from the following description are accomplished in accordance with this invention, generally speaking, by providing a coating composition which is repellent to adhesive substances, comprising a solution, in an inert organic solvent, of (1) a diorganopolysiloxane having Si-bonded hydroxyl groups in the terminal units, (2) an organopolysiloxane free of amino groups and having Si-bonded hydrogen, (3) a tin compound and (4) an amino-substituted silicon compound comprising a copolymer having units of the formula

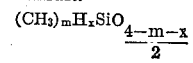

wherein $m$ and $x$ each have a value of from 0 to 3 and $m$ has an average value of from 0.9 to 2.5, and aminoorganosiloxane units of the formula

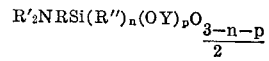

wherein R is a divalent hydrocarbon radical, R' is hydrogen or an alkyl or aminoalkyl radical, R'' is a monovalent hydrocarbon radical, Y is an alkyl radical having from 1 to 5 carbon atoms, $n$ and $p$ each have a value of from 0 to 2 and the sum of $n+p$ is less than 3, and, optionally, units of other hydrocarbonsiloxanes.

When compared with the previously known organopolysiloxane release coatings, including those compositions disclosed in British Patent Specification 1,111,156, which contain a solution of a diorganopolysiloxane having Si-bonded hydroxy groups in the terminal units, an organo polysiloxane having Si-bonded hydrogen, an amino-substituted silicon compound and a tin compound and, optionally, an amino-free cross-linking alkoxysilane, the compositions of this invention display one or more of the following advantages: (a) they are more easily accessible; (b) they are less toxic; (c) they are more stable to separation; (d) they have a longer pot life and display a faster cure rate; (e) no post-againg, or no long post-aging time is required for the coatings of this invention; (f) they yield coatings which adhere better to the substrate and are more abrasion-resistant; and (g) they yield coatings which exhibit improved release characteristics when contacted with adhesive materials.

Surprisingly, the compositions of this invention exhibit a long pot life and display a fast cure rate even in the absence of major amounts of solvent. This is particularly surprising, since it was necessary to add major amounts of additives to the compositions known heretofore for the preparation of release coatings, such as organopolysiloxane coatings in order to extend the pot life of the composition and thus reduce the curing rate of the composition. Consequently, the coated substrate had to stand for long periods of time to prevent them from adhering together, that is to say, so-called "blocking," rolled-up or stacked coated structures. In order to have a rapid cure rate, it was necessary to have a short pot life and hence premature curing of the organopolysiloxane in the feed device. Also, it had been assumed that without the addition of major amounts of additives to increase pot life, the curing time was always directly proportional to the pot life.

The copolymers used according to this invention as amino-substituted silicon compounds (4), should contain units of the formula $$(CH_3)_m H_x SiO_{\frac{4-m-x}{2}}$$

in an amount by weight equal to the weight of the aminoorganosiloxane units, but should not be more than about 18 times this weight.

The radicals represented by R in the aminoorganosiloxane units can be any desired divalent hydrocarbon radicals, for example, the methylene, propylene, butylene and isobutylene radicals as well as the cyclohexylene, octadecamethylene, phenylene and butenylene radicals. Because of their accessibility, those radicals represented by R, such as the propylene radical, which produce a bridge of at least 3 carbon atoms between the nitrogen and the silicon atom, are preferred.

Suitable examples of alkyl or aminoalkyl radicals represented by R' are methyl, ethyl, isopropyl and octadecyl radicals and radicals of the formula $H_2NCH_2CH_2-$, $(CH_3)_2NCH_2CH_2-$, $H_2N(CH_2)_5-$, $H(NHCH_2CH_2)_3-$ and $C_4H_9NHCH_2CH_2NHCH_2CH_2-$. In general it is preferred that at least one R' be hydrogen.

Examples of radicals represented by R'' are alkyl radicals, such as methyl, ethyl, isopropyl and octadecyl radicals; alkenyl radicals, such as vinyl, allyl and hexenyl radicals; cycloaliphatic hydrocarbon radicals, such as cyclopentyl, cyclohexyl, cyclohexenyl and methylcyclohexyl radicals; aromatic hydrocarbon radicals, such as phenyl, naphthyl, xenyl, tolyl and xylyl radicals; and aralkyl radicals, such as benzyl, beta-phenylethyl and beta-phenylpropyl radicals.

Examples of alkyl radicals represented by Y are methyl, ethyl, propyl and isopropyl radicals.

The preferred values of $n$ are 0 and 1 and the preferred value of $p$ is 0.

The copolymers used according to this invention as amino-substituted silicon compounds (4) can be prepared by various methods, including mixed hydrolysis or equilibration. According to a particularly preferred technique, these copolymers are prepared by a non-equilibrating reaction of (A) 1 to 20 parts by weight of liquid methylpolysiloxanes having Si-bonded hydroxyl groups with (B) 1 part by weight of a silane of the formula $$R'_2NRSi(R'')_n(OY)_{3-n}$$

wherein R, R', R'', Y and $n$ have the same definition as above, or a hydrolysis product of such a silane, as described, for example, in British Patent Specification No. 942,587. This reaction can be effected by mixing the reactants at room temperature. In order to accelerate and/or complete the reaction, it is advisable, in most cases, to heat the reaction mixture under reflux in an organic solvent, such as toluene or perchloroethylene. If hydrolysis products of silanes of the above-mentioned formula are employed in this reaction, such hydrolysis products can be partially or complete hydrolyzed products. Generally, only those hydrolysis products will be employed which have been prepared by mixing the silanes with up to 60 percent of the theoretical equivalent of water, as specified in British Patent Specification No. 942,587.

The liquid Si-bonded methylpolysiloxanes (A) possessing hydroxyl groups, which are employed in this reaction, are known substances, or belong to known classes of compounds, as do all the other compounds described herein. Preferably, the methylpolysiloxanes (A) contain exclusively dimethylsiloxane units; however, if desired, other methylsiloxane units, namely monomethylsiloxane and trimethylsiloxane units, and/or $SiO_{4/2}$ units and/or small amounts of other hydrocarbonsiloxane units may be present in addition to the dimethylsiloxane units. Examples of other hydrocarbonsiloxane units which may be present are vinylmethylsiloxane, phenylmethylsiloxane, diphenylsiloxane and/or ethylmethylsiloxane units. Because of their accessibility, it is preferred that the methylpolysiloxanes (A) not contain any siloxane units other than dimethylsiloxane units and, optionally, up to a total of about 30 mol percent of monomethylsiloxane and $SiO_{4/2}$ units, except as impurities.

According to another preferred method, the copolymers used according to the invention as amino-substituted silicon compounds (4) may be prepared by the reaction of Si-bonded hydroxyl groups with Si-bonded hydrogen [see, for example, W. Noll, "Chemie und Technologie der Silicone" ("Chemistry and Technology of Silicones"), 2nd edition, Weinheim, 1968, p. 175] or by the reaction of Si-bonded hydroxyl groups, produced after splitting off Si-bonded hydrogen, with alkoxysilanes by the reaction of (A') 1 to 20 parts by weight of liquid methylpolysiloxanes which contain Si-bonded hydrogen, with (B') either a hydrolysis product of 1 part by weight of a silane of the formula $$R'_2NRSi(R'')_n(OY)_{3-n}$$

or water and 1 part by weight of a silane of the formula $$R'_2NRSi(R'')_n(OY)_{3-n}$$

This reaction can take place at room temperature by mixing the methylpolysiloxanes (A') containing Si-bonded hydrogen with the silanes of the above-mentioned formula and water. Although it is essential that at least 1 mol of water per mol of silane be employed, the upper limit is only a question of economics. Preferably not more than about 2 mols of water are employed per mol of silane in order to achieve particularly rapid curing. Even though the reaction is adequately catalyzed by the amino groups present in the silane or in the hydrolysis product thereof it may be advisable to heat the reaction mixture under reflux in an organic solvent, such as toluene or perchloroethylene in order to accelerate and/or complete the reaction.

The silicon valencies of the methylpolysiloxanes (A') containing Si-bonded hydrogen which are not saturated by hydrogen and methyl groups are saturated by siloxane oxygen atoms and possibly other groups. It is sufficient if the methylpolysiloxanes (A') contain only one Si-bonded hydrogen atom per molecule, that is to say, if, for example, in the methylpolysiloxanes (A) one hydroxyl group is replaced by Si-bonded hydrogen. Preferably, the methylpolysiloxanes (A') contain an average of 0.33 to 1.25 Si-bonded hydrogen atoms per Si atom and 0.7 to 1.3 methyl groups per Si atom and contain at least 10 Si atoms per molecule. The methylpolysiloxanes (A') containing Si-bonded hydrogen are preferably linear, with the chains being at least predominantly built up of units of the formula $CH_3Si(H)O$ and possessing, as terminal units, those of the formula $Si(OH)_y(H)_{x'}(CH_3)_z$, wherein $x'$, $y$ and $z$ each have a value of from 0 to 3 and the sum of $x'+y+z$ is 3. In addition, the methylpolysiloxanes (A') containing Si-bonded hydrogen can also be cyclic.

Examples of suitable silanes (B) are those of the formulae $(CH_3)_2NCH_2CH_2CH_2Si(OCH_3)_3$
$H_2NCH_2CH_2NHCH_2CH_2CH_2Si(OCH_3)_3$
$C_2H_5NH(CH_2)_{10}Si(OCH_3)_3$
$H_2N(CH_2)_5Si(C_6H_5)(OC_5H_{11})_2$
$H_2NCH_2CH_2NHCH_2Si(CH=CH_2)(OCH_3)_2$
$CH_3NHCH_2CH_2N(CH_3)(CH_2)_3Si(OC_2H_5)_3$.

The copolymers (4) used in accordance with this invention are appropriately employed in amounts of from 1 to 20 percent by weight and more preferably from 3 to 6 percent by weight based on the weight of the diorganopolysiloxanes (1) having Si-bonded hydroxyl groups in the terminal units.

The diorganopolysiloxanes (1) of this invention may be those which have been used heretofore in release coatings. They can be represented by the general formula

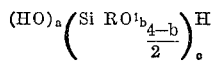

wherein $R^1$ represents a monovalent hydrocarbon radical or a substituted hydrocarbon radical, $a$ has an average value of 0.9 to 1.1, preferably 0.99 to 1.01, $b$ has an average value of 1.9 to 2.0, preferably 1.99 to 2.01 and the sum of $a+b$ is 3 and $c$ is an integer having a value of at least 100. It is obvious, from the average value of $b$ (1.9 to 2.1), that the diorganopolysiloxane (1) can optionally contain siloxane units in small amounts of different degrees of substitution, such as units of the formula $R^1SiO_{3/2}$.

Hydrocarbon radicals represented by $R'$ are methyl, ethyl, isopropyl and octadecyl radicals; alkenyl radicals, such as vinyl radicals; cycloaliphatic hydrocarbon radicals, such as cyclohexyl radicals and aryl radicals, such as phenyl radicals. The 3,3,3-trifluoropropyl radical may be mentioned as an example of a substituted hydrocarbon radical. Because of their accessibility, it is preferred that at least 50 percent of the $R^1$ radicals be methyl radicals.

In addition, the $R^1$ radicals on the individual silicon atoms can be the same or different. The diorganopolysiloxanes can be homopolymers, copolymers or mixtures of different copolymers and/or homopolymers each having the same degree of polymerization or mixtures of identical or different homopolymers or copolymers of different degrees of polymerization. When they are copolymers they may be copolymers with a statistical distribution of the individual units or block copolymers.

Where a particularly high degree of repellency and a particularly rapid cure is desired, the radicals represented by $R'$ in the diorganopolysiloxanes (1) having Si-bonded hydroxyl groups in the terminal units should contain primarily methyl groups, or at least not more than 10 percent of the number of the $R'$ radicals should be radicals other than methyl groups.

Under certain conditions, a lesser degree of repellency is desired which is sometimes described as an "increased level of peeling strength." Thus, for example in the so-called transfer process, a layer of pressure-sensitive adhesive is first applied to, for example, a paper or one side of a paper, which carries a coating of increased level of peeling strength. This layer is in turn covered with for example, a paper or one side of a paper which contains a coating having a high degree of repellency towards an adhesive substance, that is to say a low level of peeling strength. This arrangement can easily be stored and transported. When used, the paper possessing the coating with a low level of peeling strength, or the side of the paper possessing the coating with a low level of peeling strength is removed, and the paper or side of the paper possessing the pressure-sensitive adhesive is placed on the substrate to which the adhesive is to be transferred, for example a fabric, in such a manner that the layer of adhesive is located between the paper and the substrate to which it is to be transferred, and pressed on to the latter substrate, for example by means of rollers. The paper having the coating of increased level of peeling strength is then removed leaving the layer of adhesive as completely as possible on the substrate to which it has been transferred, just as, in the previous removal step of the paper, the coating of lower level of peeling strength, or of the corresponding side of the paper, no adhesive should be pulled off at the same time. This means that coatings which repel adhesive substances and have a different degree of repellency for adhesive substances are required.

Another application in which a low degree of repellency, but not complete repellency of adhesives, is desired, are coatings on flexible sheet-like structures, for example paper, on which self-adhesive labels are to be stored. Here, on the one hand, the repellency of adhesives should not be so great that the labels slip off the substrate, while on the other hand the degree of repellency of the adhesive substances should be such that the labels together with the adhesive can be easily detached from the substrate. The same is frequently true of interleaving papers, release papers and covering papers and in coatings for the rear faces of self-adhesive tapes and self-adhesive films.

Where a lesser degree of repellency toward an adhesive substance is desired, then from 3 to 30 mol percent and more preferably from 5 to 20 mol percent, of the siloxane units of the diorganopolysiloxanes (1) having Si-bonded hydroxyl groups in the terminal units should be diphenylsiloxane units, while at least 50 percent of the number of radicals $R^1$ in the remaining units are methyl groups. The diphenylsiloxane units can be statistically distributed and/or be present as diphenylsiloxane blocks in addition to the other siloxane units. The higher the proportion of the diphenylsiloxane units, the lesser the extent of the rejection of adhesive substances, and consequently the higher the level of peel strength. If all $R^1$ radicals in the diorganopolysiloxanes are methyl groups, the force required for removing an adhesive substance only amounts to 0 to 10 g./cm. width. If all the dimethyl siloxane units in these diorganopolysiloxanes are replaced by diphenylsiloxane units, the force for removing the same adhesive substance amounts to 200 to 250 g./cm. width. Thus by regulating the ratio of dimethylsiloxane units to diphenylsiloxane units, the degree of repellency of the adhesive substances can be controlled as desired and the degree of repellency selected remains substantially constant for a long time.

Although the degree of repellency of adhesive substances has been controlled by the thickness of the coating, it is too difficult for practical use, since the range of coating thickness between the value at which an inadequate separation effect is achieved and the value at which the level of peeling strength is too low is extremely small and the effort required to maintain a certain constant value within this range over the course of a production period is too great.

The degree of repellency of adhesive substances may be regulated by other means, such as by the addition of additives. Examples of suitable additives are polymers which are free of Si-atoms, for example polyvinyl alcohol, polyvinyl acetate and/or polyisobutylene, or organopolysiloxane resins, or inorganic fillers, such as quartz powder. However, the addition of additives to regulate the degree of repellency of adhesive substances have some disadvantages. For example the compositions require constant agitation to prevent separation of the individual components; the additives are sufficiently active and/or they have an adverse effect on the nature of the coatings on the surfaces and/or the initially increased level of peeling strength declines over the course of a few days or weeks on storing the coated articles. For this reason, organic polymers free of Si-atoms, organopolysiloxane resins and/or inorganic fillers are preferably not used in the compositions of this invention.

Where no reduction, or only a very slight reduction in the degree of repellency toward adhesive substances with which the coatings of this invention come into contact is desired, then the diorganopolysiloxanes (1) possessing Si-bonded hydroxyl groups in the terminal units should have a viscosity of at least 100,000 cs./25°, and more preferably at least 1,000,000 cs./25° C.

The organopolysiloxanes (2) which have Si-bonded hydrogen and are free of amino groups have been used heretofore in coating or impregnating compositions to repel adhesive substances or water. These organopolysiloxanes containing Si-bonded hydrogen have been described heretofore in detail, such as methylpolysiloxane (A'). The preferred organopolysiloxanes (2), compounds may be represented by the general formula

wherein $f$ is at least 10 and is for example, 50.

In order to achieve a rapid cure rate, the organopolysiloxanes (2) containing Si-bonded hydrogen are appropriately employed in amounts of from 1 to 20 percent by weight and more preferably from 3 to 6 percent by weight, based on the weight of the diorganopolysiloxanes (1) having Si-bonded hydroxyl groups in the terminal units.

Tin compounds (3), employed in the compositions of this invention are those compounds which heretofore were used as condensation accelerators in the preparation of coatings based on organopolysiloxanes for repelling adhesive substances. Examples of suitable tin compounds are organo-tin acylates, especially diorgano-tin acylates, such as dibutyl-tin diacetate, dibutyl-tin dilaurate, dioctyl-tin maleate and dibutyl-tin di-2-ethylhexoate. The acylates which are preferred for achieving especially rapid curing are those having 5 or less carbon atoms in the acyl radicals. Dibutyl-tin diacetate is the preferred tin compound.

The tin compounds are preferably employed in amounts of from 1 to 20 percent by weight and more preferably from 3 to 6 percent by weight, based on the weight of the diorganopolysiloxanes (1) containing Si-bonded hydroxyl groups in the terminal units.

In order to prepare the compositions of this invention, the diorganopolysiloxanes (1), the organopolysiloxanes (2) containing Si-bonded hydrogen, the copolymers containing amino-substituted silicon compounds (4) and the tin compounds (3) are dissolved and mixed in an organic solvent. If the compositions of this invention are stored and/or shipped before use, the diorganopolysiloxanes (1) possessing Si-bonded hydroxyl groups in the terminal units and the organopolysiloxanes (2) possessing Si-bonded hydrogen can be stored, and shipped either alone or as a mixture. The copolymers used according to the invention as amino-substituted silicon compounds (4) and the tin compounds (3) should be added to these organopolysiloxanes separately or as a mixture only shortly prior to use.

The organic solvents used for preparing the compositions of this invention should be inert and free of water, must not have any adverse effect, at least at room temperature on the compounds to be dissolved therein. In addition, the solvents should be sufficiently volatile so that they evaporate rapidly at 70° C. to 180° C./760 mm. Hg (absolute). Examples of suitable solvents are, hydrocarbons, such as benzine, for example alkane mixtures having a boiling range of from 80° C. to 100° C. at 760 mm. Hg (absolute), benzene, toluene and xylenes; inert chlorinated hydrocarbons, such as trichloroethylene; oxygen-containing organic solvents, such as ethers, for example di-n-butyl ether; esters, for example ethyl acetate; alcohols, for example ethanol, isopropanol and butanol; and ketones, such as methyl ethyl ketone. If hydrocarbons, such as benzines or toluene, are used as organic solvents, then it is desirable to employ from 5 to 15 percent by weight, relative to the total weight of the solution, that is the total weight of solvents and dissolved substances, of an oxygen-containing organic solvent, such as alcohols, especially butanol and/or isopropanol. A clear solution, and a particularly long pot life, is more easily achieved as a result of this addition. Because of their accessibility, benzines are preferred solvents for the compositions of this invention.

The organic solvents are generally used in amounts of from 200 to 5,000 percent by weight based on the weight of the diorganopolysiloxanes (1) containing Si-bonded hydroxyl groups in the terminal units.

In addition to the components mentioned heretofore, the compositions of this invention can also contain other substances, such as methyl-tris-beta-methoxy-ethoxysilane.

If the surfaces to be rendered repellent to adhesive substances are non-absorbent or only slightly absorbent, the compositions of this invention are appropriately employed in amounts of from 0.1 to 0.5 g. of organosilicon compounds (1), (2) and (4) per m.$^2$ of surface to be rendered repellent to the adhesive substances. Where the surfaces to be rendered repellent to adhesive substances are absorbent, the compositions of this invention are appropriately employed in amounts of from 1 to 3 g. of organosilicon compounds (1), (2) and (4) per m.$^2$ of surface to be rendered repellent to the adhesive substances. The use of more of the organosilicon compounds in the case of absorbent surfaces can be avoided if these surfaces are pre-treated with pore-sealing substances, for example a solution of polyvinyl alcohol in water or polyvinyl acetate in an organic solvent.

The compositions of this invention can be applied to the surfaces to be rendered repellent to adhesive substances in any desired manner which is known for the preparation of coatings from solutions, for example by dipping, spreading, casting, spraying, roller application, printing or knife-coating.

In order to remove the solvent rapidly and accelerate the curing of the coatings, it is desirable to heat the coated substrate to a temperature of from about 40° C. to 200° C. and more preferably from 70° C. to 120° C. However, the coatings can also be cured at room temperature.

The compositions of this invention may be used for the preparation of coatings which repel adhesive substances on any desired solid surfaces, such as, for example paper, cork, plastic films, metals and ceramic articles. In addition, these compositions are suitable, for example, for the preparation of release, covering and interleaving papers, cardboards and films. Likewise these compositions may be used for coating the bottom surfaces of self-adhesive tapes and self-adhesive films, for the finishing of packaging materials, such as paper, cardboard boxes, metal films and drums, for example of cardboard, plastic, wood, iron and other metals, which are intended for the storage and/or transportation of adhesive foodstuffs, such as honey, cakes and other confectionery materials such as, bonbons, meat, or adhesives, for example in the case of the transfer process discussed heretofore, or adhesive substances, such as self-adhesive labels, raw rubber and asphalt.

Various aspects of the invention are further illustrated by the following examples which are not to be taken as in any way limiting the scope thereof. In the examples, all parts are by weight, unless otherwise specified.

EXAMPLE 1

A solution containing about 5 parts of a dimethylpolysiloxane having one Si-bonded hydroxyl group in each of the terminal units, and having a Brabender plasticity of 600 mkg., and 0.3 part of methylhydrogenpolysiloxane, end-blocked with trimethylsiloxy groups and having a viscosity of about 40 cs. at 25° C. in about 9.7 parts of toluene is diluted with about 79.4 parts of an alkane mixture with a boiling range of from 80 to 110° C. at 760 mm. Hg (absolute) and mixed with about 0.3 part of a reaction product containing 1.99 parts of a dimethylpolysiloxane possessing one Si-bonded hydroxyl group in each of the terminal units and containing 3.5 percent by weight of Si-bonded hydroxyl groups and 1.00 part of N-beta-aminoethyl - gamma - aminopropyltrimethoxysilane. About 5.3 parts of a solution containing 0.3 part of dibutyl-tin diacetate in 5 parts of isopropanol are then added to the solution.

A glassine web is coated, in a continuously operated installation, with the solution thus obtained, using the indirect gravure printing process, whereby the paper takes up about 0.5 g. of organosilicon compounds per m.$^2$, and is then passed through a drying tunnel. The drying tunnel is 3 m. long and the air in the drying tunnel is maintained at a temperature of about 165±5° C. A portion of the paper web is passed through the drying tunnel at a speed of about 30 m./minute, a second portion of the web at a speed of 60 m./minute and a third portion of the web at a speed of 90 m./minute. Even at these various speeds, the coating is completely cured immediately after leaving the drying tunnel, exhibits excellent resistance to abrasion and adheres firmly to the substrate.

If the glassine coated web as described above is used to cover self-adhesive films, it shows excellent release properties on storage without impairing the adhesive strength.

EXAMPLE 2

A coating composition which will repel adhesive substances is prepared in accordance with the procedure described in Example 1, except that 79.4 parts of toluene is substituted for the alkane mixture and 0.3 part of the reaction product containing 1.99 parts of methylhydrogenpolysiloxane end-blocked with trimethylsiloxy groups, having a viscosity of 40 cs. at 25° C., 1.00 part of the aminoorganosilane mentioned in Example 1 and water is substituted for the reaction product of dimethylpolysiloxane and the aminoorganosiloxane described in Example 1. In addition 5 parts of n-butanol was substituted for the isopropanol as catalyst solvent. (The reaction product described above is prepared by adding dropwise over a period of about 30 minutes a solution containing 222 parts of N-beta-aminoethyl-gamma-amino - propyltrimethoxysilane, 342 parts of toluene and 111.3 parts of methylhydrogenpolysilane and cooled to $+5\pm5°$ C. to 18 parts of water with agitation while maintaining the temperature of the mixture at $+5\pm5°$ C. The mixture is then stirred for 3 hours at room temperature and finally for 2 hours at 110° C., after which the formation of hydrogen is complete.)

In a continuously operated installation, a web of calendered kraft paper is first passed through the solution thus obtained and then through the 3 m. long drying tunnel, using a dwell time of 10 seconds. The air in the drying tunnel is maintained at a temperature of about 120° C. Immediately after leaving the drying tunnel, the coating is completely cured, exhibits excellent resistance to abrasion, adheres firmly to the substrate and exhibits excellent repellency to adhesive substances.

EXAMPLE 3

A coating composition is prepared as described in Example 1, except that in the preparation of the concentrated organopolysiloxane solution, 15 parts of trichloroethylene are substituted for the 9.7 parts of toluene. In the preparation of the finished solution 79.1 parts by volume of trichloroethylene are substituted for the 79.4 parts by weight of toluene, and the 0.3 part of dibutyl-tin diacetate is employed undiluted.

In a continuously operated installation, a glassine web is passed through a portion of the clear solution thus obtained, and then passed through the 3 m. long drying tunnel, using a dwell time of about 10 seconds. The air in the drying tunnel is maintained at a temperature of about 120° C. Immediately after leaving the drying tunnel, the coating is completely cured, exhibits excellent resistance to abrasion and adheres firmly to the substrate. The coated paper is suitable as a covering for self-adhesive labels.

The other portion of the solution is diluted with trichloroethylene in a volume ratio of 1:1. This solution is used, in a continuously operated installation, for knife-coating a polyethylene film, the knife used being a rod of stainless steel wrapped with 0.05 mm. thick stainless steel wire, and the film is then passed through the 3 m. long drying tunnel using a dwell time of 60 seconds. The air in the drying tunnel is maintained at a temperature of about 80° C. The coating thus obtained is uniform and abrasion-resistant. After pressing on to a pressure-sensitive (self-adhesive) adhesive tape, the film provided with the coating can easily be removed without imparing the adhesive strength of the adhesive.

EXAMPLE 4

A coating composition is prepared in accordance with the procedure of Example 1, except that 5 parts of a dimethylpolysiloxane having one Si-bonded hydroxyl group in each of the terminal units and having a Brabender plasticity of 1,200 mkg. is substituted for the dimethylpolysiloxane have a Brabender plasticity of 600 mkg.

In a continuously operated installation, a web of kraft paper is coated by means of rollers which transfer the solution from a bath on to the paper and is then passed through the 3 m. long drying tunnel using a dwell time of about 8 seconds. The air in the drying tunnel is maintained at a temperature of about $165\pm5°$ C. The coating is completely cured immediately after leaving the drying tunnel. When the coated paper is used for packaging veal, the paper can easily be removed from the packaged meat even after two days storage at $+4°$ C. When self-adhesive films are covered with the coated paper, it does not impair the adhesive strength of the films and it can easily be removed even after prolonged storage of the films.

EXAMPLE 5

A coating composition which will repel adhesive substances is prepared in accordance with the procedure described in Example 1, except that 5 parts of a dimethyl polysiloxane of the same viscosity, having one Si-bonded hydroxyl group in each of the terminal units, and having 11.7 mol percent of the dimethylsiloxane units replaced by diphenylsiloxane units, is substituted for the dimethylpolysiloxane described therein. In other words a solution containing 5 parts of a copolymeric diorganopolysiloxane of 88.3 mol percent of dimethylsiloxane units and 11.7 mol percent of diphenylsiloxane units, having one Si-bonded hydroxyl group in each of the terminal units and having a Brabender plasticity of 600 mkg. and 0.3 part of methylhydrogenpolysiloxane, end-blocked with trimethylsiloxy groups and having a viscosity of 40 cs. at 25° C. in 9.7 parts of toluene is diluted with 79.4 parts of an alkane mixture having a boiling range of from about 80° C. to 110° C. at 760 mm. Hg (absolute) and then mixed with 0.3 part of the reaction product of 1.99 parts of dimethylpolysiloxane having one Si-bonded hydroxyl group in each of the terminal units and containing 3.5 percent by weight of Si-bonded hydroxyl groups and 1.00 part of N-beta-aminoethyl-gamma-aminopropyltrimethoxysilane. A solution containing about 0.3 part of dibutyl-tin diacetate in 5 parts of isopropanol is then added to the solution.

In a continuously operated installation, a glassine web is knife-coated with the substantially clear solution thus obtained, using as the knife a stainless steel rod wrapped with 0.2 mm. thick stainless steel wire, so that the paper takes up about 0.5 g. of organosilicon compounds per m.$^2$, and then passed through the 3 m. long drying tunnel using a dwell time of about 60 seconds. The air in the drying tunnel is maintained at a temperature of about 120° C. Immediately after leaving the drying tunnel, the coating is completely cured and very resistant to abrasion and adheres firmly to the substrate.

Samples of the coated paper web are tested the same day they are prepared and on the day following the preparation of the coating. Also they are tested thirteen times at intervals of 14 days for a total of 182 days storage at 20° C. and 55 percent by weight relative atmospheric humidity, to determine the degree of repellency of adhesive substances, that is the level of the peeling strength and the retention of the adhesive strength of an adhesive.

The level of the peeling strength is determined in the following manner: 2 strips of Tesa self-adhesive tape ("Tesa" is a trademark—red film, No. 154, of Messrs. Beiersdorf, Hamburg), 3 cm. wide, are placed on the coating, pressed down by means of a rubber roller using a force of 15 kg./cm. and subjected to a load of 20 g./cm.$^2$ for 20 hours. Thereafter the force required to pull the adhesive tapes from the substrate at a speed of 30 cm./minute is determined.

The determination of the level of the peeling strength gives a value of 30 to 50 g./cm. width of strip for the paper web coated as described above, both before and after storage.

The retention of the adhesive strength of the adhesive is determined in the following manner:

After determining the level of the peeling strength as described above, the adhesive tapes removed from the coating which repels adhesive substances are placed on a degreased glass plate and pressed down by means of a rubber roller using a force of 2 kg./cm. Thereafter, the force which is required for pulling the adhesive tapes from the substrate at a speed of 15 cm./minute is measured.

The determination of the retention of the adhesive strength of the adhesive in the case of the paper web coated as described above gives the same value both before and after storage.

EXAMPLE 6

A coating composition which repels adhesive substances is prepared in accordance with the procedure in Example 5, except that, 5 parts of a copolymeric diorganopolysiloxane containing 83 mol percent of dimethylsiloxane units and 17 mol percent of diphenylsiloxane units, having one Si-bonded hydroxyl group in each of the terminal units, and having a Brabender plasticity of 500 to 600 mkg. is substituted for the copolymer described therein.

In a continuously operated installation, a glassine web is first passed through the solution thus obtained and then through the 3 m. long drying tunnel, using a dwell time of about 30 seconds. The air in the drying tunnel is maintained at a temperature of about 120° C. Immediately after leaving the drying tunnel, the coating is completely cured and very resistant to abrasion and adheres firmly to the substrate.

Samples of the paper web coated in this way are tested on the same day they are prepared and on the day following the preparation of the coating. Also they are tested several times at intervals of 14 days; for a total of 168 days storage at 20° C. and 55 percent by weight relative atmospheric humidity, as indicated in Example 5. The determination of the level of peeling strength in each case gives a value of 50 to 70 g./cm. width of strip both before and after storage, and the determination of the retention of the adhesive strength of the adhesive also gives a value which remains constant.

EXAMPLE 7

A coating composition is prepared in accordance with the procedure described in Example 5, except that 5 parts of a copolymeric diorganopolysiloxane containing 80.6 mol percent of dimethylsiloxane units and 19.4 percent of diphenylsiloxane units, having one Si-bonded hydroxyl group in each of the terminal units and having a Brabender plasticity of 500 to 600 mkg. is substituted for the copolymer described therein. In the preparation of the concentrated organopolysiloxane solution, about 14.7 parts of trichloroethylene are substituted for the 9.7 parts of toluene. In the preparation of the final solution, 79.4 parts by volume of trichloroethylene are substituted for the 79.4 parts by weight of toluene, and the 0.3 part of dibutyl-tin diacetate is employed undiluted.

In a continuously operated installation, a glassine web is coated by means of rollers which transfer the solution from a bath onto the paper, in such a way that the paper takes up about 0.5 to 1 g. of organosilicon compounds per m.², and is then passed through the 3 m. long drying tunnel using a dwell time of 60 seconds. The air in the drying tunnel is maintained at a temperature of about 120° C. Immediately after leaving the drying tunnel, the coating is completely cured and very resistant to abrasion and adheres firmly to the substrate.

Samples of the paper web coated in this way are tested the same day they are prepared and on the day following the preparation of the coating. Also they are tested repeatedly after intervals of 8 days for a total of 5 months storage at 20° C. and 55 percent by weight relative atmospheric humidity, as indicated in Example 5. The determination of the level of peeling strength both before and after storage in each case gives a value of 70 to 90 g./cm. width of the strip, and the determination of the retention of the adhesive strength of the adhesive also gives a value which remains constant.

EXAMPLE 8

A 29.5 x 21.0 cm. sheet of glassine paper is coated on one surface with the composition described in Example 1, and after curing this coating by warming it to 120° C. for 60 seconds, is coated on the other surface with the composition described in Example 5. After the latter coating has also been cured by warming to 120° C. for 60 seconds, a 20 cm. long and 2 cm. wide strip of polyvinyl chloride, which is coated on both sides with the same pressure-sensitive adhesive, is placed on the coating produced from the composition of Example 1, in such a manner that an approximately 8 cm. wide strip of the paper between one end of the adhesive tape and the edge of the paper remains uncovered. The paper is then rolled up on a round rod, starting with the portion free of adhesive tape, between the edge of the paper and the end of the adhesive tape, and is then unrolled again. In the course thereof, the adhesive tape is transferred from the side having the coating from the composition of Example 1 onto the surface having the composition of Example 5. The adhesive tape is easily transferred from the latter side onto a cotton fabric.

EXAMPLE 9

(a) A coating composition which repels adhesive substances is prepared in accordance with Example 5, except that 5 parts of a copolymeric diorganopolysiloxane containing 86 mol. percent of dimethylsiloxane units and 14 mol. percent of diphenylsiloxane units, having one Si-bonded hydroxyl group in each of the terminal units and having a Brabender plasticity of 600 mkg., is substituted for the copolymer described therein.

(b) A coating composition is prepared in accordance with the procedure described in Example 5, except that 5 parts of a copolymeric diorganopolysiloxane containing 83.6 mol. percent of dimethylsiloxane units and 16.4 mol. percent of diphenylsiloxane units, having one Si-bonded hydroxyl group in each of the terminal units, is substituted for the copolymer described therein.

(c) A coating composition is prepared in accordance with Example 5, except that 5 parts of the copolymer described in Example 7, containing 19.4 mol. percent of diphenylsiloxane units is substituted for the copolymer of Example 5. The Brabender plasticity of the diorganopolysiloxanes according to (b) and (c) is in each case 600 mkg.

(d) Four 29.5 cm. x 21.0 cm. sheets of glassine paper, coated, respectively, on one surface with the composition described in Example 5, and with the three compositions described above under (a), (b) and (c). The coating in each case is cured by warming to 120° C. for 60 seconds. Four papers having coatings of different levels of peeling strength are thus produced. A 2 cm. wide strip of polyvinyl chloride coated on both sides with the same pressure-sensitive adhesive is placed on the coating obtained from the composition of Example 5. The coated paper prepared from the composition described above under (a) is then placed on the as yet uncovered side of the adhesive strip in such a manner that the latter coating rests on the hitherto uncovered side of the adhesive strip, and the load of 20 g./m.² is applied. The two papers joined by means of the adhesive tape are then peeled apart. Hereupon, the adhesive tape remains on the coating of the composition described above under (a). From there, the adhesive tape is transferred, in accordance with the procedure described above, to the coating prepared from the composition described above under (b), from this coating on to the coating prepared from the composition described above under (c) and finally onto a sheet of pine wood which does not possess an organopolysiloxane coating.

EXAMPLE 10

In a continuously operated installation, the composition prepared in acordane with Example 6 is applied by means of a knife to the hitherto uncoated surface of the glassine web coated according to Example 1, using as the knife a stainless steel rod wrapped with 0.2 mm. thickness stainless steel wire, and the coating is cured in accordance with Example 5. A 50 percent strength by weight solution of a mixture of 100 parts of a copolymer containing 50 parts by weight of vinyl acetate and 50 parts by weight of vinyl laurate, having a K-value of 48, measured in acetone at 20° C., 7 parts of an acid wax (melting point: 80 to 83° C.; solidification point, degrees C. according to DIN 51,566: 76 to 79; acid number 125 to 145; saponification number: 150 to 170; ester number: 25; unsaponifiable matter: 7 to 10 percent by weight; specific gravity at 20° C.: 0.99 to 1.00) and 5 parts of a polyadipate acting as a polymeric plasticiser and having a softening point of about 30° C. [compare H. Gnamm and W. Sommer, Losungsmittel und Weichmachungsmittel (Solvents and Plasticisers), Stuttgart, 1958, p. 710] in ethyl acetate, as a pressure-sensitive adhesive, is then applied to the coating composition described in Example 6, using an amount of 85 g. of solution/m². The solvent is evaporated off at about 120° C. and finally the paper treated in this manner is wound in a roll. After a storage time of 4 weeks the paper roll is again unrolled, whereupon the pressure-sensitive adhesive remains completely on the coating described in Example 6, and a web of cotton poplin is placed on the as yet uncovered side of the layer of the adhesive and pressed down onto the adhesive by means of a roller. The paper web is then removed, whereupon the pressure-sensitive adhesive remains completely on the fabric, so that the paper web can be reused for the same purpose. A part of the fabric is then pressed, with the adhesive side, onto pine wood and another part of the fabric onto concrete.

EXAMPLE 11

The procedure described in Example 1 is repeated with the exception that 0.3 part of the reaction product containing 2 parts of a dimethylpolysiloxane having one Si-bonded hydroxyl group in each of the terminal units and containing 3.5 percent by weight of Si-bonded hydroxyl groups, and 1.25 parts of N-beta-amino-ethyl-gamma-hydroxylpropyltriethoxysilane are substituted for the reaction product containing dimethylpolysiloxane and the aminoorganosilane described therein.

Essentially the same results are obtained in this Example as were obtained in Example 1.

Although specific examples of the invention have been described herein, other variations and modifications falling within the spirit and scope of the appended claims are to be included therein.

The invention claimed is:

1. A coating composition having substantially non-adherent properties which comprises (1) a diorganopolysiloxane having Si-bonded hydroxyl groups in the terminal units, (2) from 1 to 20 percent by weight based on the weight of the diorganopolysiloxane (1) of an organopolysiloxane free of amino groups and having Si-bonded hydrogen, (3) from 1 to 20 percent by weight based on the weight of the diorganopolysiloxane (1) of a tin compound, (4) from 1 to 20 percent by weight based on the weight of the diorganopolysiloxane (1) of an amino-substituted silicon copolymer having units of the formula

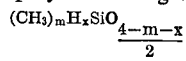

and aminoorganosiloxane units of the formula

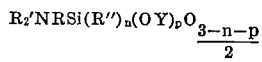

in which the copolymer contains units of the formula

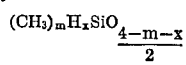

in an amount at least equal to but no more than 18 times the weight of the aminoorganosiloxane units, R is a divalent hydrocarbon radical, R' is selected from the group consisting of hydrogen, alkyl and aminoalkyl radicals, R" is a monovalent hydrocarbon radical, Y is an alkyl radical having from 1 to 5 carbon atoms, $n$ and $p$ each have a value of 0 to 2 and the sum of $n+p$ is less than 3, wherein $m$ and $x$ each have a value of from 0 to 3 with the average value of $m$ being 0.9 to 2.5, and from 200 to 5000 percent by weight based on the weight of the diorganopolysiloxane (1) of an inert organic solvent substantially free of water.

2. The composition of Claim 1, wherein the radicals R in the aminoorganosiloxane units are radicals which produce a bridge of at least three carbon atoms between the nitrogen atom and the silicon atom.

3. The composition of Claim 1, wherein at least one R' in the aminoorganosiloxane is hydrogen.

4. The composition of Claim 1, wherein Y is selected from the group consisting of methyl, ethyl, propyl and isopropyl radicals.

5. The composition of Claim 1, wherein $n$ has a value of from 0 to 1.

6. The composition of Claim 1, wherein $p$ is 0.

7. The composition of Claim 1, wherein the copolymer (4) is the reaction product of from 1 to 20 parts by weight of a liquid methyl polysiloxane containing silicon-bonded hydroxyl groups and one part by weight of a silane of the formula

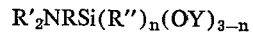

or a hydrolyzed product of said silane wherein R is a divalent hydrocarbon radical, R' is selected from the group consisting of hydrogen, alkyl and aminoalkyl radicals, R" is a monovalent hydrocarbon radical, Y is an alkyl radical having from 1 to 5 carbon atoms and $n$ has a value of from 0 to 2.

8. The composition of Claim 1, wherein the copolymer (4) is the reaction product of from 1 to 20 parts by weight of a liquid methyl polysiloxane containing silicon-bonded hydrogen and a silane selected from the class consisting of the hydrolysis product of one part by weight of a silane of the formula

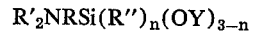

or water and one part by weight of the silane of the formula

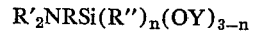

wherein R is a divalent hydrocarbon radical, R' is selected from the group consisting of hydrogen, alkyl and aminoalkyl radicals, R" is a monovalent hydrocarbon radical, Y is an alkyl radical having from 1 to 5 carbon atoms and $n$ has a value of from 0 to 2.

9. The composition of Claim 1, wherein the copolymer (4) is present in an amount of from 3 to 6 percent by weight based on the weight of diorganopolysiloxane (1).

10. The composition of Claim 1, wherein the diorganopolysiloxane (1) has the general formula

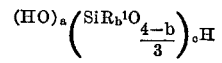

in which R¹ is selected from the group consisting of monovalent hydrocarbon radicals and substituted hydrocarbon radicals, $a$ has an average value of from 0.9 to 1.1, $b$ has an average value of from 1.9 to 2.1 and the sum of $a+b$ is 3 and $c$ is an integer having a value of at least 100.

11. The composition of Claim 10, wherein $a$ has an average value of from 0.99 to 1.01 and $b$ has an average value of from 1.99 to 2.01.

12. The composition of Claim 10, wherein at least 50 percent of the number of R¹ radicals are methyl radicals.

13. The composition of Claim 12, wherein from 3 to 30 mol percent of the siloxane units in the diorganopolysiloxane (1) are diphenyl siloxane units.

14. The composition of Claim 13, wherein from 5 to 20 mol percent of the siloxane units of the diorganopolysiloxane (1) are diphenyl siloxane units.

15. The composition of Claim 1, wherein the organopolysiloxane (2) is a liquid methyl polysiloxane.

16. The composition of Claim 15, wherein the organopolysiloxane (2) is a compound of the formula $$(CH_3)_3SiO[H(CH_3)SiO]_f Si(CH_3)_3$$

wherein $f$ is at least 10.

17. The composition of Claim 1, wherein the organopolysiloxane (2) is present in an amount of from 3 to 6 percent by weight based on the weight of diorganopolysiloxane (1).

18. The composition of Claim 1, wherein the tin compound (3) is a diorganotin acylate.

19. The composition of Claim 18, wherein the acyl radicals of the diorganotin acylate each contain less than 5 carbon atoms.

20. The composition of Claim 19, wherein the diorganotin acylate is dibutyltin diacetate.

21. The composition of Claim 1, wherein the tin compound (3) is present in an amount of from 3 to 6 percent by weight based on the weight of the diorganopolysiloxane (1).

22. The composition of Claim 1, wherein the organic solvent is selected from the class consisting of a hydrocarbon, a chlorinated hydrocarbon, an oxygen-containing organic solvent and mixtures of two or more such solvents.

23. The composition of Claim 1, wherein the solvent is selected from the class consisting of benzine, benzene, toluene, xylene, trichloroethylene, an ether, an ester, an alcohol, a ketone and mixtures of two or more of such solvents.

24. The composition of Claim 1, wherein the solvent is a mixture of a hydrocarbon and 5 to 15 percent by weight based on the total weight of the solution of an oxygen-containing organic solvent.

References Cited

UNITED STATES PATENTS

| | | | |
|---|---|---|---|
| 3,530,092 | 9/1970 | Borchert | 260—46.5 E |
| 3,671,484 | 6/1972 | Cooper et al. | 260—33.6 SB |
| 3,524,900 | 8/1970 | Gibbon et al. | 260—825 |
| 3,565,838 | 2/1971 | Atkinson et al. | 260—825 |
| 3,702,769 | 11/1972 | Vaughan | 260—825 |
| 3,494,977 | 2/1970 | Heit | 260—825 |
| 3,418,162 | 12/1968 | Adachi | 260—825 |

FOREIGN PATENTS

| | | | |
|---|---|---|---|
| 1,111,156 | 4/1968 | Great Britain | 260—825 |

WILBERT T. BRIGGS, SR., Primary Examiner

U.S. Cl. X.R.

117—161 ZA; 260—31.2 R, 32.8 SB, 33.2 SB, 33.4 SB, 33.6 SB, 33.8 SB, 46.5 E, 46.5 H, 825